Dec. 15, 1931. B. RICHTER 1,836,131
GAS FILTER
Filed Nov. 13, 1929

Patented Dec. 15, 1931

1,836,131

UNITED STATES PATENT OFFICE

BERNHARD RICHTER, OF BERLIN, GERMANY

GAS FILTER

Application filed November 13, 1929, Serial No. 406,907, and in Germany July 7, 1928.

Filters for air and gas cleaning are known, the filter elements of which, often metal plates of special shape, are built together to form an endless band like a link chain. This band is directed vertically to the air or gas current so that the air or gas flows through the two halves of the band consecutively. The band is set in motion by motor or hand drive and runs over drums or discs at the top or bottom. At the bottom the band also dips into a vessel containing moistening liquid. This type of filter (circulating filter possesses, as compared with filters composed of individual cells (cell filter), the great advantage that the removal of the collected dust and the rewetting of the filter elements are effected automatically through the band dipping into the wetting liquid, so that the tending and serving of the filter plant is considerably facilitated.

The known circulating filters are, however, open to several great objections which are due to their form of construction. If the circulating band be moved in upward direction on the dusty air side (air inlet side), the dust travels with the filter elements on which it has deposited towards the pure air side (air outlet side), where it is again drawn off by the air or gas current so that it arrives with this current at the point of use. For this reason perfect air and gas cleansing is illusory. If on the other hand the circulating band be moved in downward direction through the liquid container, the dust collected will certainly be removed and the band will then enter the pure air space in clean condition, but in this instance the danger exists, that the moistening liquid carried along by the band from the container will be drawn off by the air or gas current. This is particularly the case if the turning movement of the band must be carried out at high speed (for example, when separating large quantities of gas), so that the excess liquid has not sufficient time to drip off. Besides which, contrary to requirements, the side of the circulating band with this direction rotation is wetted most which has to collect the smallest quantity of dust, whereas the side which the dusty air or gas current first encounters has in the meantime dried, owing to the long path from the container over the reversing point.

These disadvantages existing in the known circulating filters are overcome by the invention.

An embodiment of the invention is illustrated by way of example in the accompanying drawings in which Fig. 1 shows a diagrammatical longitudinal section through the filter.

The essential novelty of the invention consists in that the circulating band composed of filter elements is not moved like a belt or chain, but like a paternoster elevator, i. e. in such a manner that the two rows of filter elements forming the circulating band are arranged one behind the other and through which the air or gas flows consecutively. The filter consists of two endless chains $a$ which run in a known manner over sprocket wheels $b$ and $c$ at the bottom and the top respectively. Cages $d$ are fastened to these chains and carry filter elements of any type, for example plates $e$ of special shape. Thus two rows of filter elements are produced, one above the other, which are brought into the air or gas path so that they are situated the one behind the other in the direction thereof. The cages $d$ have on their two ends pins $f$ rotatably mounted in the link bolts $g$ of the chain $a$. A container $h$ for the wetting liquid is arranged under the circulating band, in which container the cages $d$ dip consecutively during the rotation of the chain $a$. The turning movement may be effected by a hand crank $i$, a motor or other suitable means.

The filter is closed at the top by a hood $k$, at the bottom by the container $h$ and on both sides by walls $l$.

In order to ensure that the cages remain suspended in vertical position during the whole of their travel, the pins $f$ are fitted at a suitable height above the centre of gravity of the cages. At the upper and lower reversing points $m$ and $n$ respectively, the cages $d$ separate. In order to enable this movement to be effected without difficulty, a certain amount of clearance $o$ must be provided between the individual cages, the size and shape of which clearance is determined by the mutual relative movement of the cages. This clearance must be closed against the current of dusty air or gas in such a manner, that the positive movement of the cages in relation to each other is not impeded. As means for closing brushes $p$ made of thin wire, hair or vegetable fibre may for example be used, which are fastened above and below the cages. These brushes are very yielding so that they can engage the one in the other and at the same time have a sufficiently close structure to prevent the passage of dust. The lateral packing of the filter elements is effected by suitably shaped sheet metal strips $q$ and by the links of the chain $a$. In this manner an effective labyrinth packing $r$ is formed on the two sides of the cage.

Figure 1:
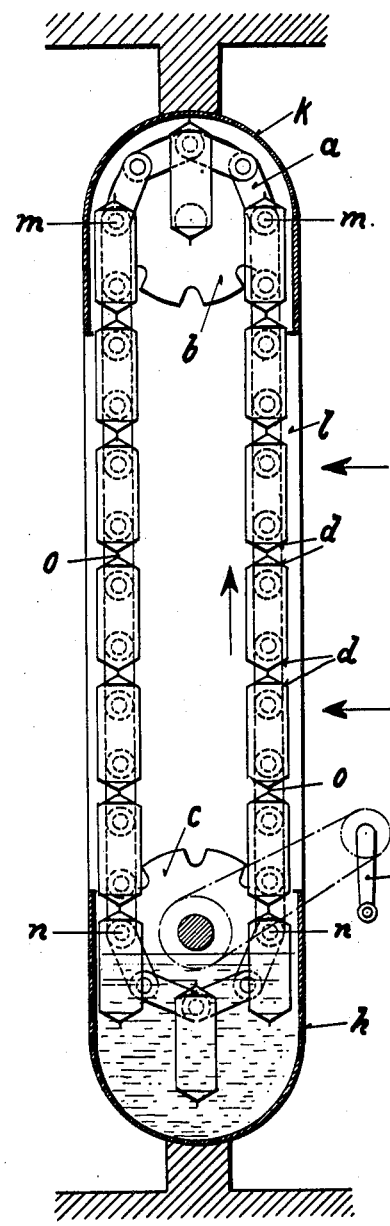
Figure 2:
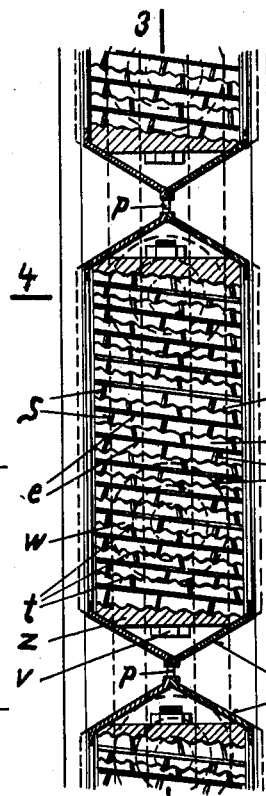
Fig. 2 shows a longitudinal section through a filter element on a larger scale.
Figure 3:
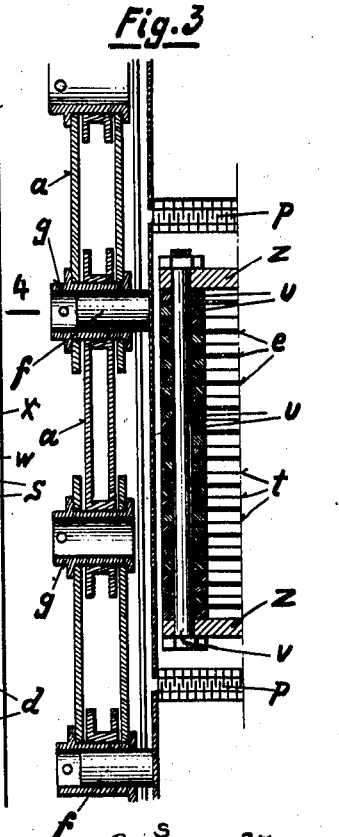
Fig. 3 is a cross section on line 3—3 of Fig. 2.
Figure 4:
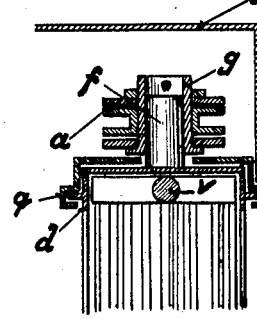
Fig. 4 is a cross section on line 4—4 of Fig. 2.
Figure 5:
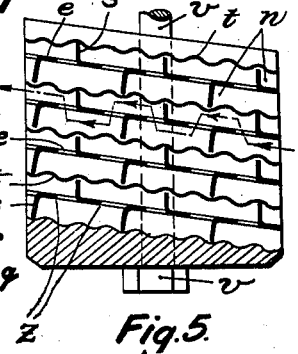
Fig. 5 shows on a larger scale in longitudinal section the lower portion of a filter element, as illustrated in Fig. 2.

A new type of filter elements for filling the cages $d$ is illustrated in Figs. 2 to 4. The filter elements consist of flat plates $e$, on which a suitable number of tongues $s$ project in known manner, behind each other in the direction of the air or gas current either inclined or vertically. The plates differ from the known construction of this type in that the tongues $s$ are arranged over the whole length of the plate with the exception of a narrow strip at the end and are arranged, alternately extending in upward and downward direction to the direction of the air and gas current. Plates are shown by way of example having three tongues $s$ extending downwardly. A further plate $t$ preferably corrugated is placed on the upwardly projecting tongues and a second plate $t$ on the downwardly projecting tongues. In this manner a narrow corrugated channel is formed between the plates $g$, through which the air or gas current must flow so that it is repeatedly and energetically deflected. Besides which numerous dead spaces $w$ are formed in which the separated dust can collect. Consequently the filter is capable of collecting large quantities of dust. Moreover the sharp corners $x$ produced by the particular stamping and by the numerous corrugations of the closing plate assist in an effective manner in removing with certainty the dust and dirt particles from the air or gas currents.

The filter plates are superposed in such a manner that a slotted plate alternates with a corrugated plate. Between the individual filter plates intermediate parts $u$ are arranged, which determine the distance between the plates. Thus a packet of slotted and corrugated plates of the desired height is formed. These plates thus built up to form a packet are connected together by suitable means for example strong plates $z$, placed above and below the packet, and screw bolts $v$ passing through the packet at each end and clamping these plates together by means of nuts. The packet thus forms a complete unit, so that the plates cannot shift in relation to one another. This packet is placed in the filter cage, so that the end walls of the filter cage engage around the outer end of the plate packet. The lower end of the filter cage, on which the brushes are fixed, is rigidly connected with the end walls, whereas the upper end is screwed onto the end walls of the cage after the insertion of the plate packet. Thus, the packet is tightly held in the filter cage and cannot shift therein.

The operation of the filter is as follows: The air or gas current enters first the front row of filter elements directed towards the dusty air and gives up the greater part of the impurities which it contains and then passes through the rear row, where it is again cleansed. The circulating band composed of the filter elements is moved from the bottom towards the top, seen from the dusty air side, by means of motor drive in a continuous slow movement; in the case of hand drive only periodically and in sections. Owing to the movement being effected like a paternoster elevator, the dusty front side of the individual filter elements, which has first encountered the dusty air or gas current, passes to the inside of the filter. From this position the existing layer of dust $y$ can no longer be drawn off by the gas or air current. This layer of dust which, according to the invention, is produced shortly after the starting of the filter and which is always present, forms a particularly effective means for obtaining a good dust removing effect. As the band travels further, the cages with the filter elements pass into the container with the wetting liquid, where the collected dust is automatically removed, and the filter elements are freshly moistened. The cleansed and freshly wetted parts then again rise on the dusty air side, so that they are fully capable of collecting fresh dust. The filter elements are therefore most saturated with moisture at the point where the air or gas current first comes into contact therewith. The excess moisture is blown back by the air or the gas into the container and cannot be carried along into the pure air space and to the point of use. This can also not take place when the filter elements in the course of their travel reach the pure air side, as they have already been subjected to the air or gas current for such a period that the whole of the excess liquid particles has been surely blown off into the inside of the filter.

I claim:

1. A filter for air and gas cleansing with a rotatable circulating band composed of filter elements, introduced into the gas or air path so that two rows of superposed filter elements are situated one behind the other in the direction of the gas and air current and are consecutively traversed by the air or gas current always from the front towards the rear, the movement of the filter elements being effected so that the side of the filter elements first flowed through in the front row in the direction of the gas or air current also comes in front towards the direction of the gas or air current in the rear row.

2. Filter as specified in claim 1, comprising in combination with the filter elements, endless chains and cages mounted on said chains carrying said elements adapted to always remain in vertical position.

3. Filter as specified in claim 1, comprising in combination with the filter elements, endless chains and cages mounted on said chains carrying said elements, and brushes arranged above and below said cages adapted to form a packing against the dusty air or gas current between said cages.

4. A filter as specified in claim 1, in which the filter elements, consists each of flat plates, tongues projecting upwardly and downwardly over the whole surface of said plates, intermediate plates placed between said tongues of adjacent plates forming narrow channels for the air or gas current and adapted to repeatedly deflect said current, and said intermediate plates having sharp edges adapted to form large dead spaces for the separated dust.

5. A filter as specified in claim 1, in which the filter elements consists each of flat plates, tongues projecting upwardly and downwardly over the whole surface of said plates, corrugated plates placed between said tongues of adjacent plates forming narrow channels for the air or gas current and adapted to repeatedly deflect said current, said corrugated plates having sharp edges adapted to form large dead spaces for the separated dust.

In testimony whereof I affix my signature.

BERNHARD RICHTER.